(12) United States Patent
Aoki et al.

(10) Patent No.: US 8,202,078 B2
(45) Date of Patent: Jun. 19, 2012

(54) BLOW MOLDING DEVICE

(75) Inventors: Tomohide Aoki, Aichi Prefecture (JP);
Takahisa Majima, Aichi Prefecture (JP);
Soji Hamaji, Aichi Prefecture (JP)

(73) Assignee: FTS Co., Ltd., Toyota, Aichi Prefecture (JP)

( * ) Notice: Subject to any disclaimer, the term of this patent is extended or adjusted under 35 U.S.C. 154(b) by 97 days.

(21) Appl. No.: 12/585,802

(22) Filed: Sep. 24, 2009

(65) Prior Publication Data
US 2010/0092593 A1 Apr. 15, 2010

(30) Foreign Application Priority Data

Sep. 26, 2008 (JP) ................. 2008-248039

(51) Int. Cl.
*B29C 49/04* (2006.01)
*B29C 49/20* (2006.01)
(52) U.S. Cl. ............ 425/503; 425/522; 425/532
(58) Field of Classification Search .......... 425/503, 425/522, 532; 264/515, 516
See application file for complete search history.

(56) References Cited

U.S. PATENT DOCUMENTS

| 4,857,258 | A | * | 8/1989 | Le Doux et al. | 264/515 |
| 5,318,740 | A | * | 6/1994 | Sadr et al. | 264/506 |
| 5,900,205 | A | * | 5/1999 | Sadr et al. | 264/531 |
| 6,402,999 | B1 | * | 6/2002 | Sadr et al. | 264/515 |

FOREIGN PATENT DOCUMENTS

| JP | 6-213748 | 8/1994 |
| JP | 8-72129 | 3/1996 |
| JP | 9-174670 | 7/1997 |
| JP | 10-146882 | 6/1998 |

* cited by examiner

*Primary Examiner* — Robert B Davis
(74) *Attorney, Agent, or Firm* — McGinn IP Law Group, PLLC

(57) ABSTRACT

A blow molding device capable of securely closing a lower end of a parison to prevent the parison from being crushed. The blow molding device includes a blow mold and a parison holding unit. The parison holding unit includes an inner holding plate adapted to be inserted in an interior of the lower end of the parison, and an outer holding plate adapted to hold an outer surface of the lower end of the parison, and the outer holding plate has a recess conforming to a configuration of the inner holding plate and is split into a plurality of holding plate members such that each of the split holding plate members is capable of sliding to hold the lower end of the parison.

17 Claims, 9 Drawing Sheets

BLOW MOLDING DEVICE

CROSS-REFERENCE TO RELATED APPLICATION

This application is related to and claims priority from Japanese patent application No. 2008-248039 incorporated herein by reference.

BACKGROUND OF THE INVENTION

1. Field of the Invention

The present invention relates to a blow molding device adapted to form a blow molded article from a thermoplastic synthetic resin.

2. Description of Related Art

Conventionally, tubular blow molded articles, such as fuel tanks for use in motor vehicles, etc., have been formed of metal, but, in recent years, thermoplastic synthetic resins have been frequently used to form such tubular blow molded articles, because they can effect lightweight vehicle bodies, no rust is generated therein, and they can be readily formed into desired configurations.

In many cases, the tubular articles made of thermoplastic synthetic resins have been formed by the blow molding method, because tubular bodies can be readily formed. With the blow molding method, a parison of a molten thermoplastic synthetic resin formed into a cylindrical configuration is extruded from the upper side of a mold, and air is blown into the parison while the parison is being held with the mold, thereby forming the tubular bodies.

In this case, however, air is blown into the parison after the parison has been inflated through preblowing so that the molding cycle becomes long to degrade the productivity. In addition, when the parison is held with the mold, the parison may be stretched so that the thickness thereof may scatter, and consequently, the wall thickness of molded tubular bodies may scatter.

On the other hand, the blow molding method may be required to provide built-in parts such as valves, baffle plates adapted to restrain noise caused by the flowing of fuel, etc. in an interior of the blow molded article, such as the fuel tank.

Accordingly, in order to provide the built-in parts in the interior of the blow molded article, a device shown in FIG. 1 has been used (see published Japanese patent applications No. Hei 9-174670 and Hei 8-72129, for example.). A built-in part 10 is held in a cavity of a blow mold 12 with a holding rod 14, and a parison 16 is lowered. Then, the blow mold 12 is closed, and the parison 16 is held with pinching plates 18. Thus, the blow molded article is formed.

Where, as shown in FIG. 2, a larger-sized built-in part 20 is provided in a blow molded article, the built-in part 20 is supported with slide cores 22 in the interior of the parison 16, and then, as shown in FIG. 3. the parison 16 is closed with the pinching plates 18. At this time, as shown in FIG. 4, a lower end 24 of the parison is crushed with the pinching plates 18 into a configuration like a straight line.

As a result, as shown in FIG. 4, projecting ends of the built-in part 20 may contact an inner surface of the parison 16 to adhere to or damage the inner surface of the parison 16.

SUMMARY OF THE INVENTION

Accordingly, it is an object of the present invention to provide a blow molding device capable of molding a blow molded article having a uniform wall thickness with a short molding cycle.

More specifically, the present invention has an object of providing a blow molding device capable of securely closing a lower end of a parison without deflating other portion of the parison upon forming a blow molded article.

According to a first aspect of the present invention, the blow molding device for forming a blow molded article, has a blow mold adapted to form an outer wall of the blow molded article, and a parison holding unit adapted to hold a lower end of a parison. The blow mold has two mold members split along a parting line thereof, and two mold members define a cavity adapted to form the blow molded article in split faces thereof. The parison holding unit is provided on a lower side of the blow mold, and has an inner holding plate adapted to be inserted in an interior of the lower end of the parison, and an outer holding plate adapted to hold an outer surface of the lower end of the parison. The outer holding plate has a recess conforming to a configuration of the inner holding plate such that the inner holding plate and the outer holding plate hold the lower end of the parison, and the outer holding plate is split into a plurality of split plates such that each of the split plates is capable of sliding to hold the lower end of the parison.

In the first aspect of the present invention, the blow molding device has a blow mold adapted to form an outer wall of the blow molded article, and a parison holding unit adapted to hold a lower end of a parison. With this arrangement, upon blow molding, the lower end of the parison can be prevented from becoming narrow on the lower side of the blow mold.

The blow mold has two mold members split along a parting line thereof, and two split mold members define a cavity adapted to form the blow molded article in split faces thereof. With this arrangement, the parison can be inflated in the cavity of the blow mold to form a blow molded article with a desired configuration.

The parison holding unit is provided on a lower side of the blow mold, and has an inner holding plate adapted to be inserted in an interior of the lower end of the parison, and an outer holding plate adapted to hold an outer surface of the lower end of the parison. By virtue of the inner holding plate, the lower end of the parison can be kept inflated without being crushed so that an inner surface of the parison is prevented from being depressed or wrinkled.

The outer holding plate has a recess conforming to a configuration of the inner holding plate such that the inner holding plate and the outer holding plate hold the lower end of the parison, and the outer holding plate is split into a plurality of split plates such that each of the split plates is capable of sliding to hold the lower end of the parison. With this arrangement, an outer periphery of the lower end of the parison is pushed with the outer holding plate and the inner holding plate so that the parison is securely held therewith and can be inflated. In addition, the volume in the interior of the parison can be kept great, a sufficient amount of air can be sealed in the interior of the parison, whereby tension for piercing an air nozzle to inflate the parison can be ensured, thereby omitting any preblowing step.

According to a second aspect of the present invention, the inner holding plate of the blow molding device has a circular configuration, an elliptical configuration or a polygonal configuration.

In the second aspect, the inner holding plate of the blow molding device has a circular configuration, an elliptical configuration or a polygonal configuration so that the lower end of the parison is kept inflated conforming to the configuration of the built-in part to prevent air leakage, whereby the built-in part can be prevented from contacting the inner surface of the parison.

According to a third aspect of the present invention, the blow molded article has a built-in part in an interior thereof, the blow molding device has a built-in part holding unit adapted to hold the built-in part in the blow molded article, and the built-in part holding unit is provided in the split faces of the blow mold.

A slide core is provided in an interior of the cavity so as to freely advance and retreat such that the built-in part and the parison are held with the slide core, and the outer wall of the blow molded article is formed in the cavity, and the built-in part holding unit includes a holding rod adapted to hold the built-in part. The holding rod is arranged to freely advance and retreat such that when the blow mold is opened, the built-in part is held in a position facing the cavity of the blow mold, whereas when the blow mold is closed, the built-in part is positioned in an interior of the parison, and after the parison and the built-in part are held with the slide core, the holding rod is removed from the blow mold.

In the third aspect, the blow molded article has a built-in part in an interior thereof, the blow molding device has a built-in part holding unit adapted to hold the built-in part in the blow molded article, and the built-in part holding unit is provided in the split faces of the blow mold. With this arrangement, the built-in part is held in a predetermined position within the parison, and upon closing the blow mold, the built-in part can be fused to the parison.

A slide core is provided in an interior of the cavity so as to freely advance and retreat, the built-in part and the parison are held with the slide core, and the outer wall of the blow molded article is formed in the cavity. With this arrangement, the built-in part is attached to a predetermined position within the blow molded article with the built-in part and the parison held with the slide core, and the outer wall of the blow molded article can be formed in the interior of the cavity.

The built-in part holding unit includes a holding rod adapted to hold the built-in part. The holding rod is arranged to freely advance and retreat such that when the blow mold is opened, the built-in part is held in a position facing the cavity of the blow mold, whereas when the blow mold is closed, the built-in part is positioned in an interior of the parison, and after the parison and the built-in part are held with the slide core, the holding rod is removed from the blow mold. With this arrangement, when the blow mold is opened, the built-in part is held with the slide core in a position facing the cavity of the blow mold, and after the built-in part is attached in the interior of the parison held with the blow mold, the holding rod is removed from the blow mold, thereby securely closing an open end of the parison.

According to a fourth aspect of the present invention, the outer holding plate is split into two split plate members, each split plate member moves toward an end face of the inner holding plate by a cylinder to contact the same, and consequently, the inner holding plate and the outer holding plate hold the lower end of the parison. After the built-in part is held with the slide core, the blow mold is closed to carry out blow molding.

In the fourth aspect of the present invention, the outer holding plate is split into two split plate members, each split plate member moves toward an end face of the inner holding plate by a cylinder to contact the same, and consequently, the inner holding plate and the outer holding plate hold the lower end of the parison. Therefore, the lower end of the parison is securely pushed with the inner holding plate and the outer holding plate so as to be securely held therewith.

According to a fifth aspect of the present invention, a parison expander capable of sliding in a radial direction of the parison is provided around the inner holding plate for enlarging the lower end of the parison.

In the fifth aspect of the present invention, a parison expander capable of sliding in a radial direction of the parison is provided around the inner holding plate for enlarging the lower end of the parison. Therefore, the lower end of the parison can be enlarged, and consequently, the inner holding plate can be securely inserted into the parison. As a result, the built-in part is prevented from contacting the inner surface of the parison so that the inner surface of the parison is prevented from being depressed or wrinkled.

According to a sixth aspect of the present invention, when the outer holding plate holds an outer side of the lower end of the parison, the parison expander becomes integral with the inner holding plate to hold an inner side of the parison.

In the sixth aspect of the present invention, when the outer holding plate holds an outer side of the lower end of the parison, the parison expander becomes integral with the inner holding plate to hold an inner side of the parison, and consequently, the parison expander and the inner holding plate define a smooth outer peripheral face so as to securely hold the parison together with the outer holding plate.

In accordance with the present invention, the inner holding plate adapted to be inserted in the interior of the lower end of the parison, and the outer holding plate adapted to hold the outer surface of the lower end of the parison are provided so that the lower end of the inflated parison can be kept inflated without being crushed by virtue of the inner holding plate, and consequently, the built-in part does not contact the inner surface of the parison, and the inner surface of the parison is not depressed nor wrinkled.

The outer holding plate has a recess conforming to the configuration of the inner holding plate, and is split into a plurality of holding plates, each being arranged to be slid for holding the lower end of the parison. With this arrangement, the outer holding plate can push the outer surface of the lower end of the parison to effect the inflating of the parison. In addition, the volume of the interior of the parison can be kept great so that the preblowing step can be omitted.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, embodiments of a blow molding device of the present invention will be explained based on a blow molding device adapted to form a fuel tank for use in a motor vehicle, as a blow molded article with reference to FIG. 5 through FIG. 16. The present invention will be explained with reference to the blow molding device for forming a fuel tank having a built-in part, but can be applied to another blow molded article having no built-in part.

Figure 1:
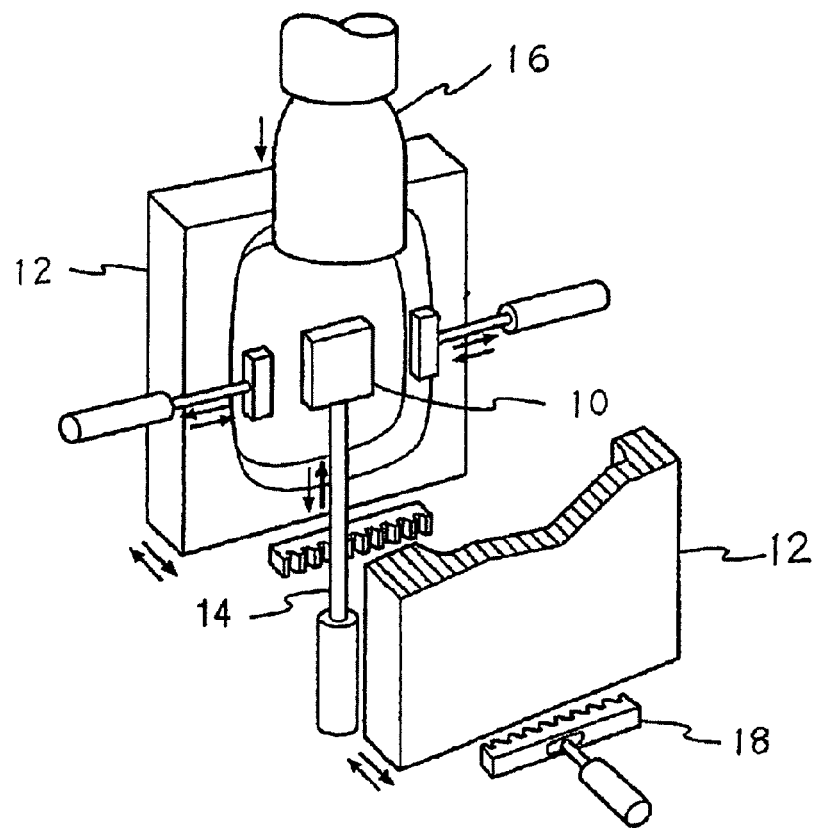
FIG. 1 is a perspective view of a conventional blow molding device having slide cores and pinching plates.
Figure 2:
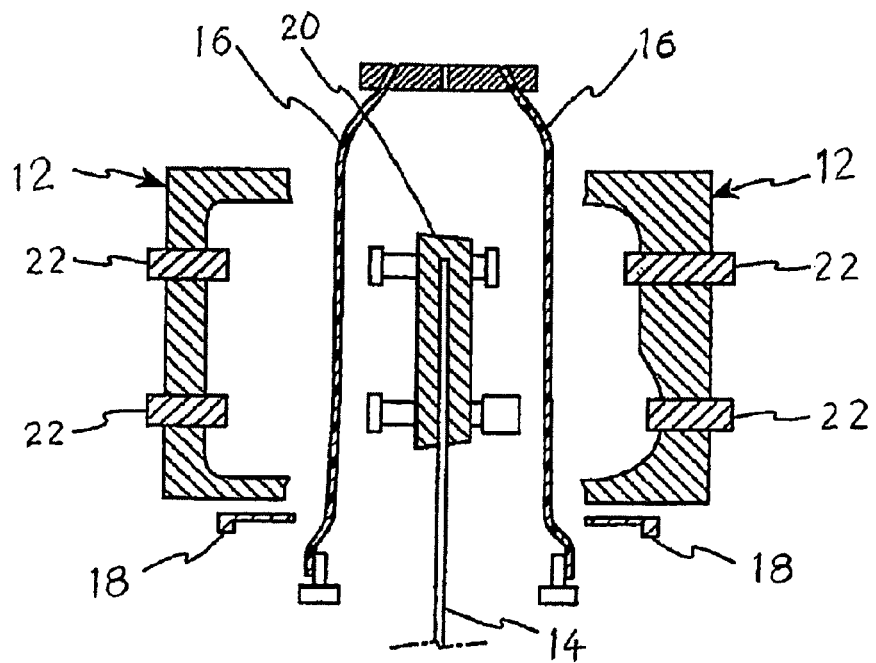
FIG. 2 is a sectional view of a conventional blow molding device, which shows a state in which a parison enters an inside of a blow mold.
Figure 3:
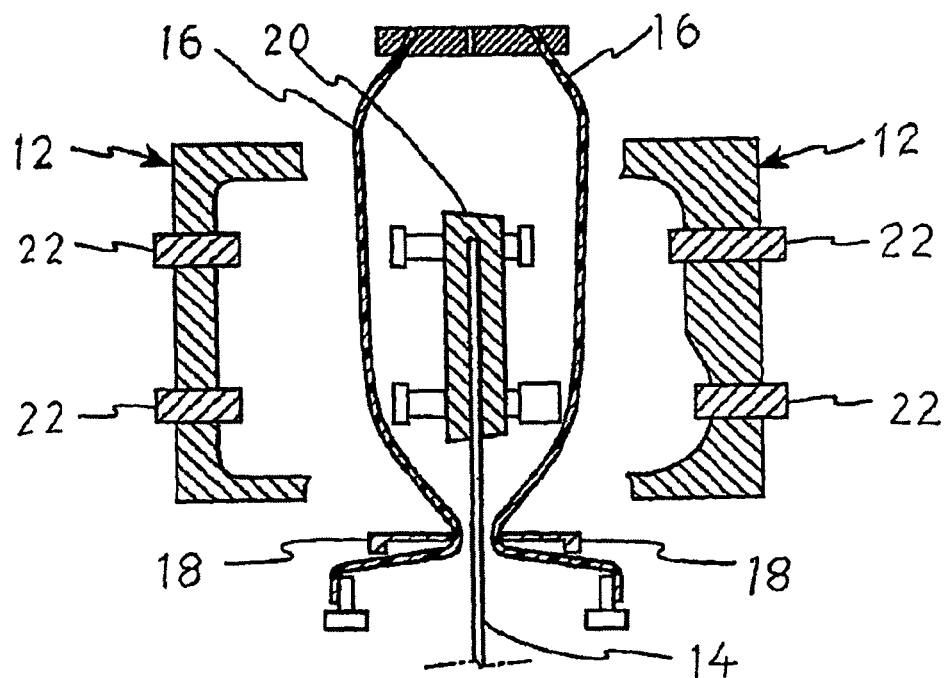
FIG. 3 is a sectional view of a conventional blow molding device, which shows a state in which an end of a parison is held with pinching plates.
Figure 4:
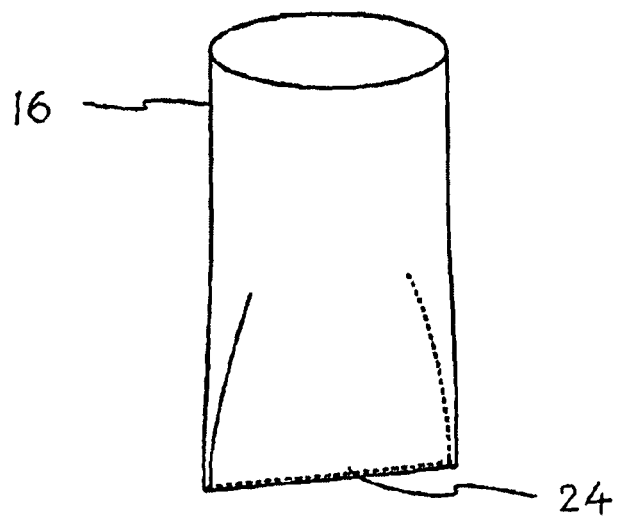
FIG. 4 is a perspective view of a conventional parison, which shows a configuration of a lower end thereof.
Figure 5:
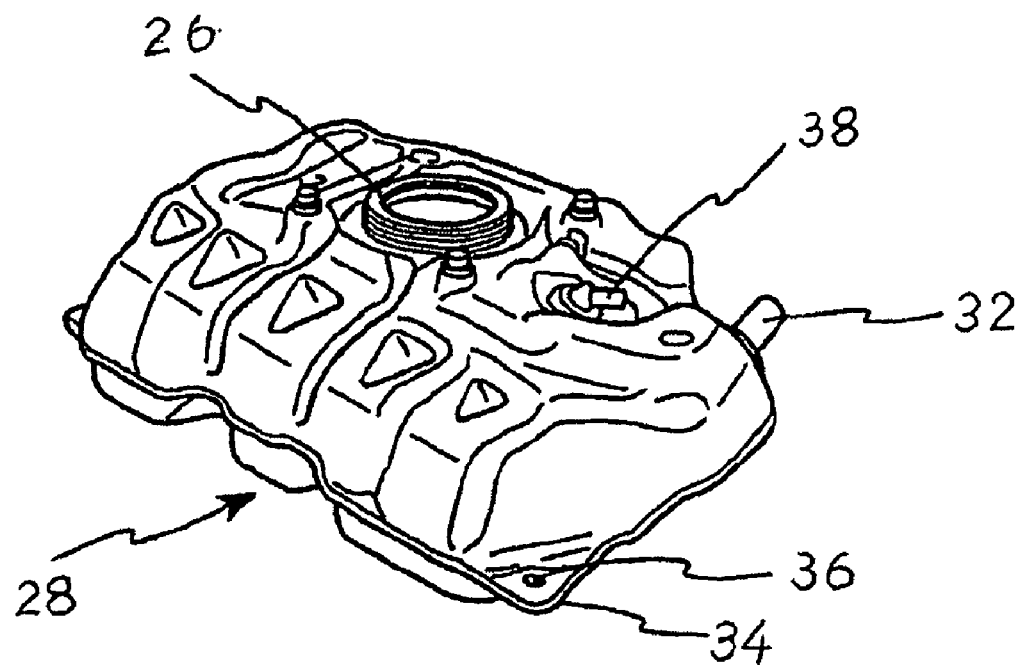
FIG. 5 is a perspective view of a fuel tank formed by embodiments of a blow molding device in accordance with the present invention.

FIG. 5 is a perspective view of a fuel tank 28, formed with embodiments of a blow molding device in accordance with the present invention.

Figure 6:
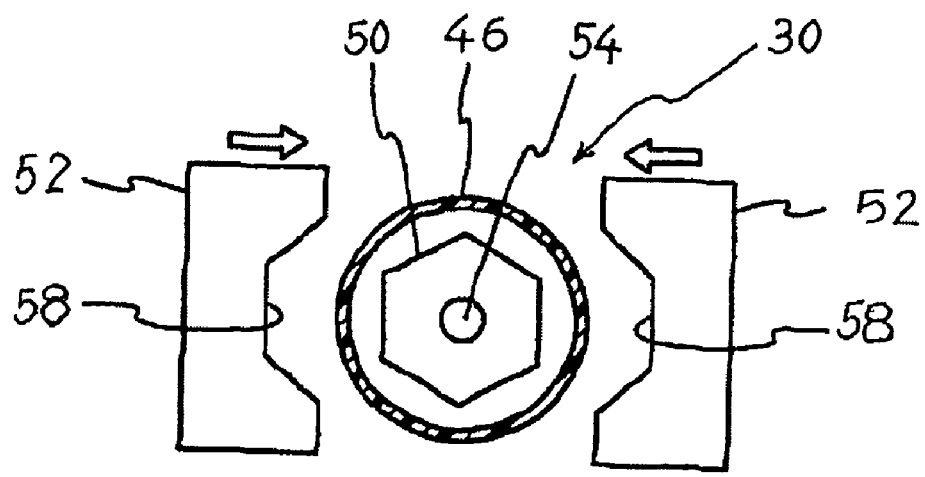
FIG. 6 is a bottom view of a parison holding unit in a first embodiment of a blow molding device in accordance with the present invention.

FIG. 6 is a bottom view of a parison holding unit 30 used in embodiments of the present invention.

Figure 13:
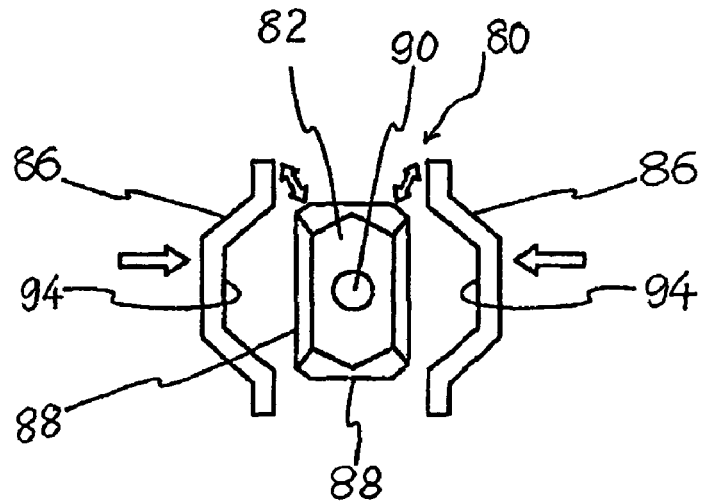
FIG. 13 is a bottom view of a parison holding unit in a second embodiment of the present invention.
Figure 14:
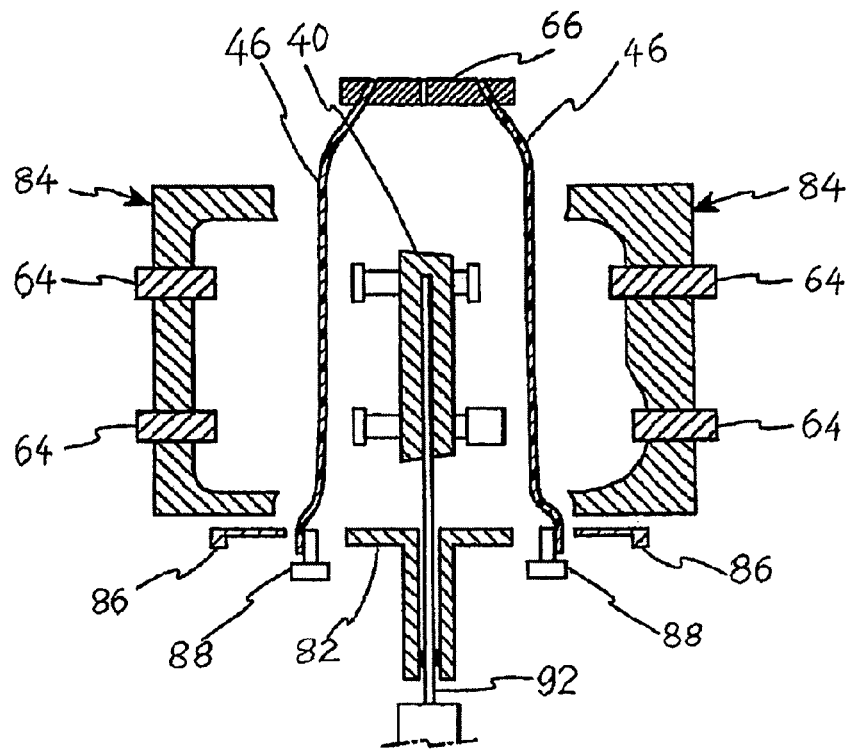
FIG. 14 is a sectional view of a second embodiment of a blow molding device of the present invention in a process of forming a blow molded article, which shows a state in which a parison enters an inside of a blow mold.
Figure 15:
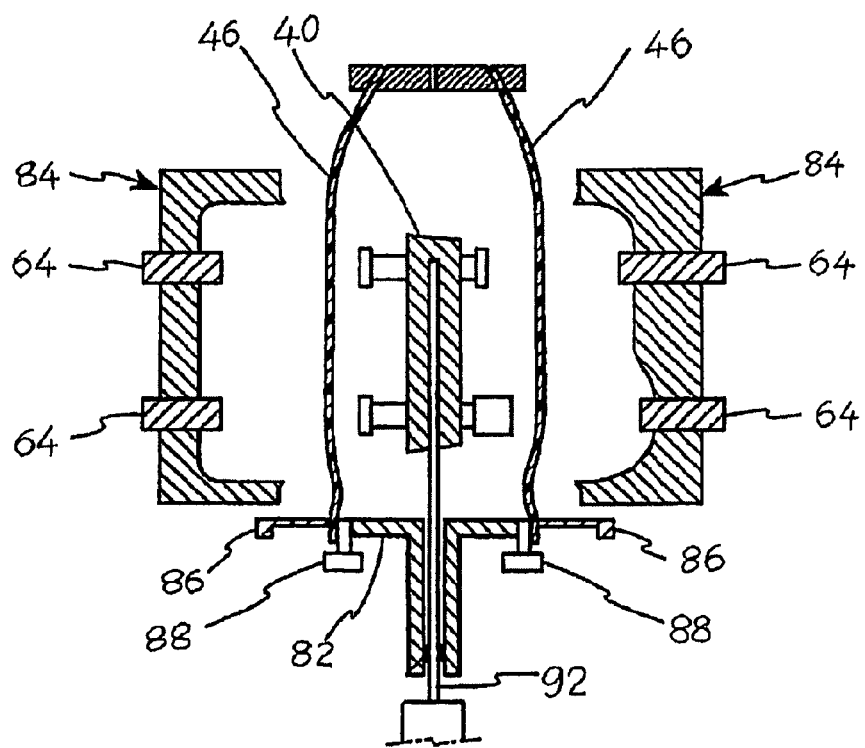
FIG. 15 is a sectional view of a second embodiment of a blow molding device of the present invention in a process of forming a blow molded article, which shows a state in which an end of a parison is held with a parison holding unit.
Figure 16:
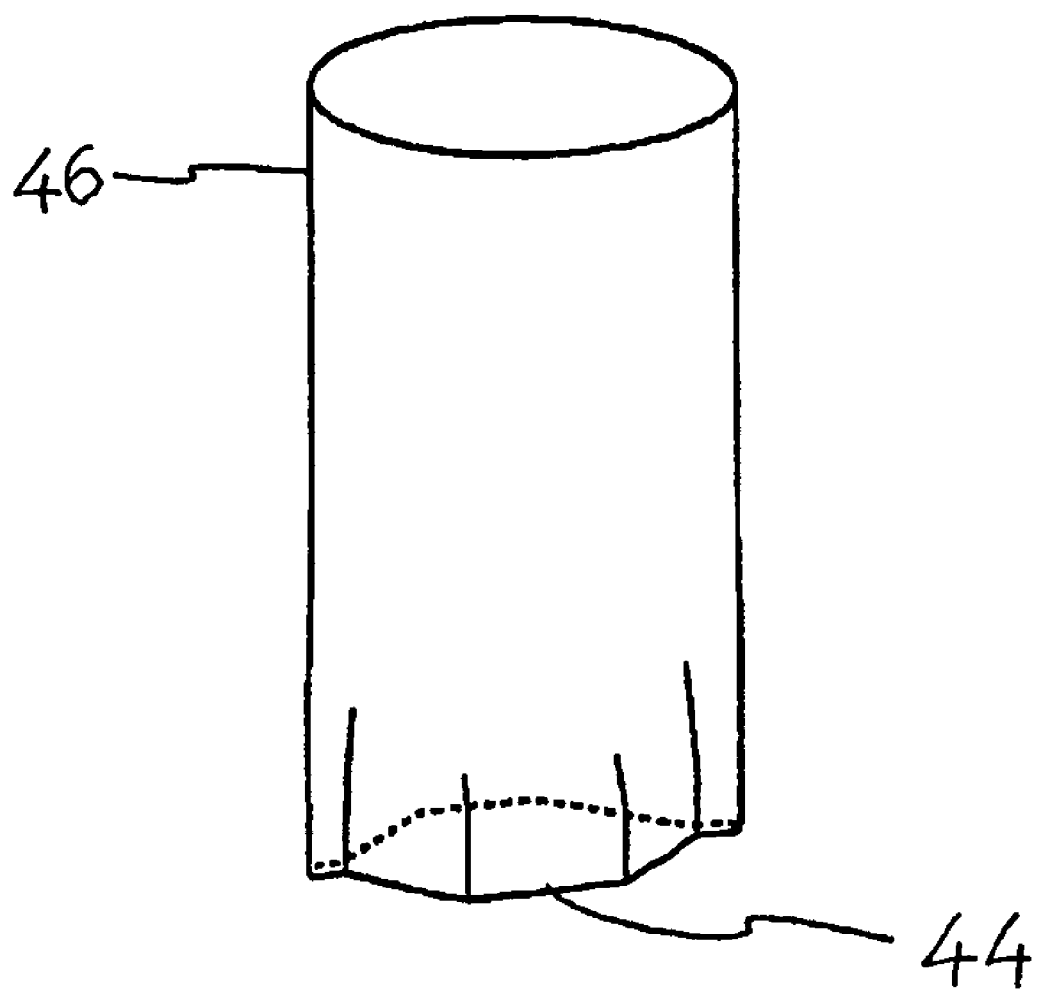
FIG. 16 is a perspective view of a parison in embodiments of the present invention, which shows a configuration of a lower end thereof.

FIGS. 7 through 12 are sectional views of a blow molding device in a first embodiment of the present invention, each showing the motion of a blow mold and a parison holding unit upon forming a blow molded article. FIGS. 13 through 15 are sectional views of a blow molding device in a second embodiment of the present invention, each showing the motion of a blow mold and a parison holding unit upon forming a blow molded article. And FIG. 16 is a perspective view showing the configuration of the parison 46 in the present invention.

As shown in FIG. 5, the fuel tank 28 formed by the blow molding device of the present invention has a pump unit mounting hole 26 for mounting a fuel pump (not shown) on the fuel tank 28 in an upper surface thereof. And, a fuel inlet hole 32 is provided in a side surface or the upper surface of the fuel tank 28 for injecting fuel from an inlet pipe (not shown).

And, an outer circumferential rib 34 is provided around the fuel tank 28 over an entire length thereof, and a plurality of tank mounting holes 36 are formed in the outer circumferential rib 34 in predetermined positions such as corners, etc. thereof. By bolting the tank mounting holes 36 and a vehicle body together, the fuel tank 28 is mounted on the vehicle body.

In addition, a mounting hole 38 is provided in the upper surface of the fuel tank 28 for connecting a hose adapted to collect evaporated fuel from an interior of the tank, etc. thereto.

The fuel tank 28 is formed using a blow molding device of the present invention. The outer wall of the fuel tank 28 is formed through blow molding into a single layer or multiple layers. In the case of the multiple layers, the outer wall includes a skin layer, an exterior main layer, an exterior adhesive layer, a barrier layer, an interior adhesive layer and an interior main layer.

A built-in part 40 such as a pillar member adapted to reinforce the fuel tank 28, a baffle plate adapted to prevent occurrences of waving of fuel, and consequently prevent occurrences of waving noise, a box adapted to mount fuel pumps, canisters, etc. is mounted in an interior of the fuel tank 28.

The built-in part 40 can be composed of a thermoplastic synthetic resin exhibiting a fuel oil resistance, such as polyacetal, high-density polyethylene (HDPE), etc. With this arrangement, the strength of the fuel tank 28 can be improved, and the rigidity of the fuel tank 28 is not reduced due to swelling by fuel oil, etc. even if the built-in part 40 is attached to the interior of the fuel tank 28.

The blow molding device of the first embodiment and the method for forming the blow molded fuel tank 28 using the blow molding device will be explained with reference to FIGS. 6 and 12. The blow molding device has a blow mold 42 adapted to mold a blow molded article, a parison holding unit 30 adapted to hold a lower end 44 of the parison 46 and a built-in part holding unit 48 adapted to hold the built-in part 40 in an interior of the blow mold 42.

First, the parison holding unit 30 will be explained with reference to FIG. 6.

The parison holding unit 30 adapted to hold the lower end of the parison 46 is provided on the lower side of the blow mold 42, and the parison holding unit 30 has an inner holding plate 50 adapted to be inserted within an end of the parison 46, which projects from a lower end of the blow mold 42, and an outer holding plate 52 adapted to hold an outer surface of the lower end of the parison 46.

The inner holding plate 50 serves to leave the lower end of the parison 46 inflated without being crushed so that when the lower end of the parison 46 is closed, the built-in part 40 is prevented from contacting an inner surface of the parison 46, and the inner surface of the parison 46 is prevented from being depressed or wrinkled.

A center hole 54 is provided in an axial center of the inner holding plate 50 for sliding a later-describing built-in part holding rod 56 with good sealing properties.

The outer holding plate 52 has a recess 58 with a configuration conforming to that of an outer surface of the inner holding plate 50. The inner holding plate 50 and the outer holding plate 52 thus arranged can hold the lower end of the parison 46. In addition, the outer holding plate 52 is split to a plurality of holding plate members, and each of the holding plate pieces is arranged so as to slide and hold the lower end of the parison 46. In the present embodiment, the outer holding plate 52 is split to two holding plate members, but it may be split to three or more holding plate members.

When the outer holding plate 52 is slid in directions shown by arrows in FIG. 6, it pushes the outer surface of the lower end of the parison 46, and consequently, the inner holding plate 50 and the outer holding plate 52 can securely hold the lower end of the parison 46 to prevent air from leaking therebetween, and prevent the lower end of the parison 46 from being crushed. In addition, the volume of the interior of the parison 46 can be kept great so that a sufficient amount of air can be sealed. Therefore, the preblowing step of slightly inflating the parison 46 for effecting tension adapted to pierce an air nozzle therethrough can be omitted before air is blown to bring the parison 46 into close contact with a molding surface of the blow mold.

Next, the blow mold 42 will be explained with reference to FIG. 7.

The blow mold 42 is split along a parting line to provide two mold members 60. The two mold members 60 are arranged so as to be respectively slid leftward and rightward with a blow mold moving unit (not shown), thereby opening the blow mold 42. The blow mold 42 defines a cavity 62 adapted to mold the fuel tank 28 in an interior thereof. In addition, slide cores 64 are slidably provided in the two mold members 60 so as to face the cavity 62.

The slide core 64 partly defines a molding surface defining the cavity 62 upon retreating, and holds the built-in part 40 and the parison 46 upon advancing into the cavity 62. The parison 46 is extruded downwardly from a nozzle 66 provided on the upper side of the blow mold 42.

When the blow mold 42 is closed, the two mold members 60 of the blow mold 42 contact each other around the cavity 62. In FIG. 7, they contact each other in upper mating faces 68 of the blow mold 42 and lower mating faces 70 thereof.

The built-in part holding unit 48 has the built-in part holding rod 56 adapted to hold the built-in part 40 and a holding rod sliding mechanism 72 adapted to slide the built-in part holding rod 56 upwardly and downwardly. The built-in part 40 is held in the cavity 62 with the built-in part holding rod 56, and when the parison 46 is lowered in the cavity 62 of the blow mold 42, the built-in part 40 is inserted in the parison 46, whereby the built-in part 40 can be mounted in the fuel tank 28 as a blow molded article. A plurality of built-in part holding rods 56 can be provided.

The built-in part holding rod 56 is arranged so as to be slidably removed from the blow mold 42, passing the center hole 54 provided in the center of the inner holding plate 50 after the built-in part 40 is positioned in the interior of the parison 46, and the parison 46 is held with the blow mold 42. After the built-in part 40 is mounted in the interior of the parison 46 held with the blow mold 42, the blow mold 42 is closed to securely close an opening of the parison 46. An air tight seal 74 is provided between the built-in part holding rod 56 and the center hole 54 of the inner holding plate 50 for preventing air from leaking from the parison 46.

Next, the method for forming a fuel tank 28 as a blow molded article using the blow molding device in accordance with the present invention will be explained with reference to FIGS. 7 through 12.

Figure 7:
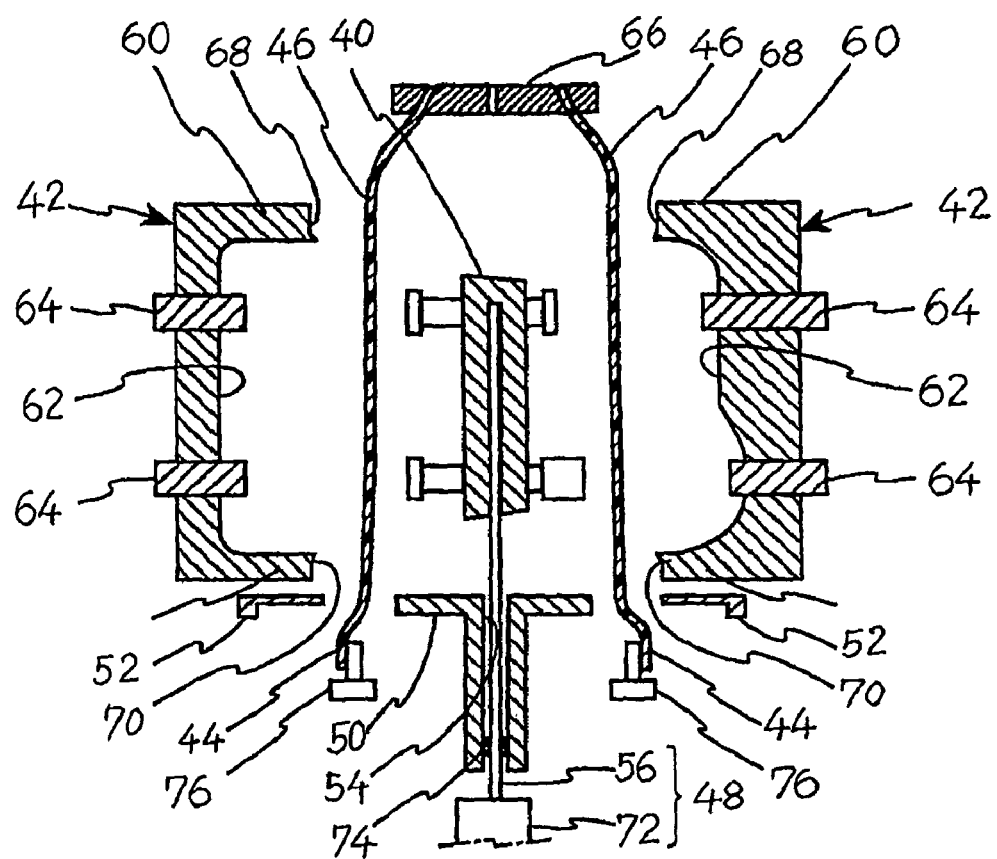
FIG. 7 is a sectional view which shows a process of forming a blow molded article with a first embodiment of a blow molding device of the present invention, and shows a state in which a parison enters an inside of a blow mold.

First, as shown in FIG. 7, the blow molding device has the blow mold 42, the parison holding unit 30 and the built-in part holding unit 48.

The blow mold 42 is split along a parting line to provide two mold members 60. The two mold members 60 are slid leftward and rightward with a blow mold moving unit (not shown) to open the blow mold 42. The blow mold 42 defines a cavity 62 adapted to mold the fuel tank 28 in an interior thereof. In addition, slide cores 64 are slidably provided in the two mold members 60.

As shown in FIGS. 7 through 12, the parison holding unit 30 is provided on the lower side of the blow mold 42.

First, the built-in part 40 is supported by the built-in part holding rod 56. Then, the blow mold 42 is opened, the built-in part holding rod 56 is slid upwardly by the holding rod sliding mechanism 72. As a result, the built-in part 40 can be positioned in the interior of the cavity 62 of the blow mold 42.

Thereafter, as shown in FIG. 7, the parison 46 is lowered from the nozzle 66 while leaving the blow mold 42 open. Consequently, the parison 46 within which the built-in part 40 is positioned lowers downwardly of the lower part of the blow mold 42, thereby inserting the inner holding plate 50 in the interior of the lower end 44 of the parison 46. As a result, the lower end 44 of the parison 46 is held with a holding section 76 of the parison holding unit 30.

Figure 8:
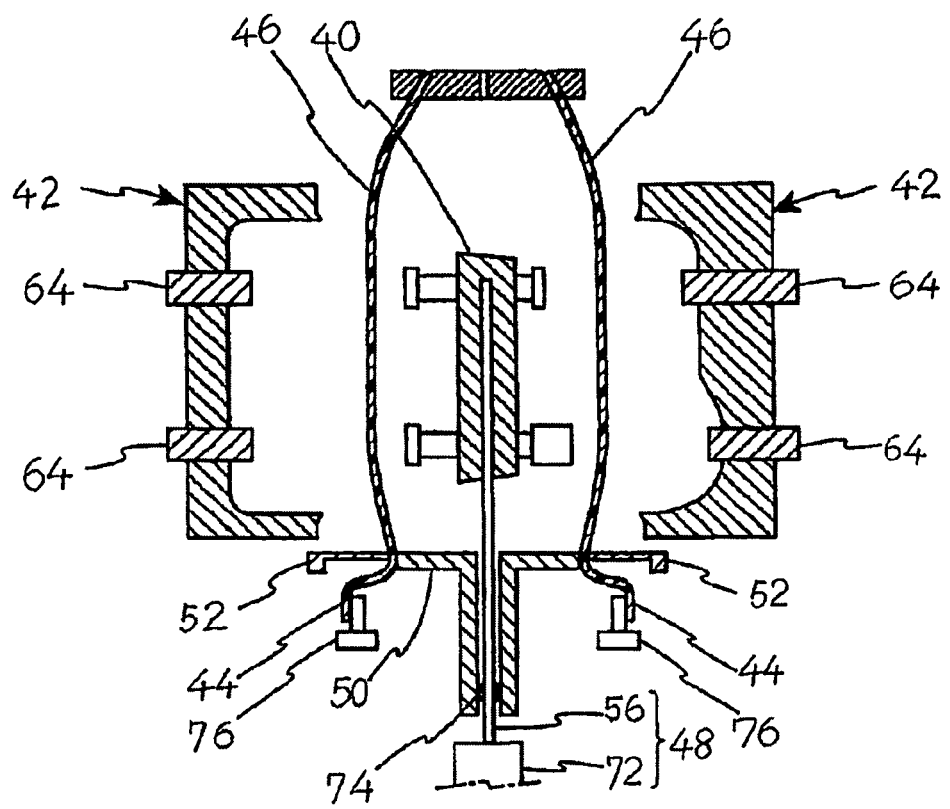
FIG. 8 is a sectional view of a first embodiment of the present invention in a process similar to that of FIG. 7, which shows a state in which a parison holding unit holds a lower end of the parison.

Next, as shown in FIG. 8, the outer holding plate 52 is slid to contact the parison 46, whereby the inner holding plate 50 and the outer holding plate 52 hold the lower end 44 of the parison 46. By virtue of the inner holding plate 50, the lower end 44 of the parison 46 can be left inflated without being crushed so that the built-in part 40 does not contact the inner surface of the parison 46. Therefore, the inner surface of the parison 46 is prevented from being depressed or wrinkled.

The built-in part holding rod 56 is inserted into the center hole 56 provided at an axial center of the inner holding plate 50. Since the built-in part holding rod 56 and the center hole 54 are sealed for preventing air leakage, as described above, air does not leak from the interior of the parison 46. Therefore, the volume of the interior of the parison 46 can be kept great to seal a sufficient amount of air in the interior of the parison 46, and consequently, tension for piercing an air nozzle 78 adapted to inflate the parison 46 through the parison 46 can be ensured without carrying out the preblowing step.

Figure 9:
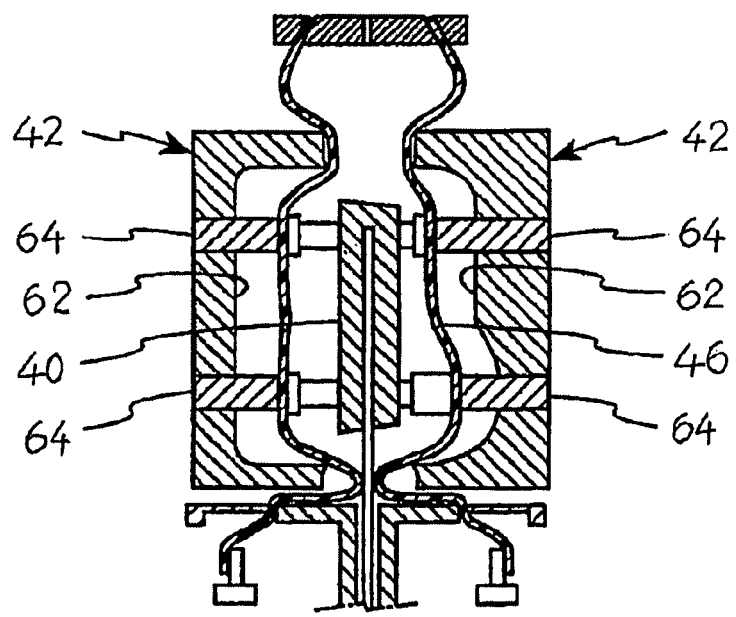
FIG. 9 is a sectional view of a first embodiment of the present invention in a process similar to that of FIG. 7, which shows a state in which slide cores hold a built-in part.

And, as shown in FIG. 9, the blow mold 42 is closed slightly, and the slide cores 64 provided in the blow mold 42 are slid. Since the slide cores 64 are provided in the positions facing the built-in part 40, the parison 46 and the built-in part 40 can be pushed with the slide cores 64.

In this state, an inner surface of the parison 46 is still in a molten state so that the parison 46 can be fused to projecting ends of the built-in part 40. At this time, the built-in part 40 is held with the built-in part holding rod 56 and the slide cores 64 so that the built-in part 40 can be securely attached to a prescribed position of the inner surface of the outer wall of the fuel tank 28.

Figure 10:
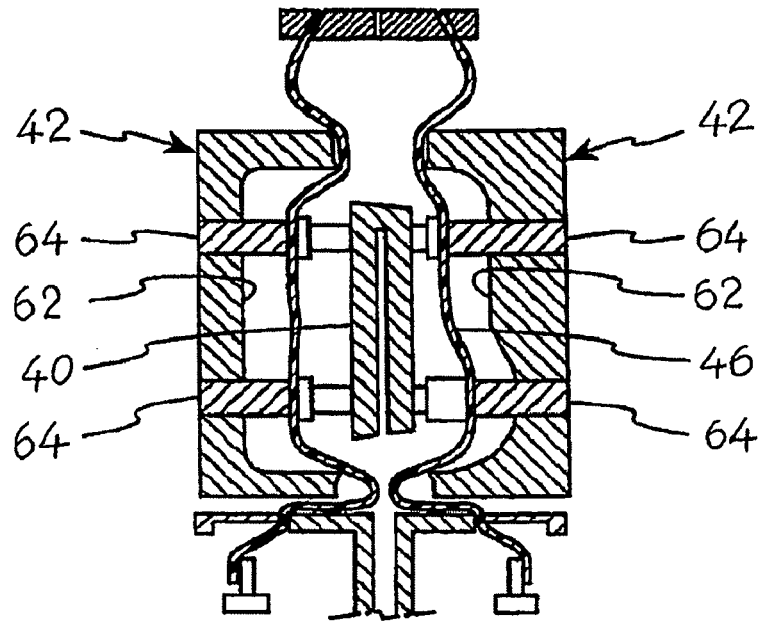
FIG. 10 is a sectional view of a first embodiment of the present invention in a process similar to that of FIG. 7, which shows a state in which a built-in part supporting rod is removed from a blow mold.

Then, as shown in FIG. 10, the built-in part holding rod 56 is lowered by the holding rod sliding mechanism 72 with the built-in part 40 held with the slide cores 64, and is removed from the blow mold 42. Since the built-in part 40 is held with the slide cores 64, the built-in part 40 can be located in a prescribed position. At this time, the lower end 44 of the parison 46 is held and sealed with the parison holding unit 30, and the center hole 56 of the inner holding plate 50 is sealed, air is prevented from leaking from the interior of the parison 46.

Alternatively, the built-in part 40 may be held with the built-in part holding rod 56 continuously without using the slide cores 64. In this case, after blow molding, the built-in part holding rod 56 is removed from the blow mold 42.

Figure 11:
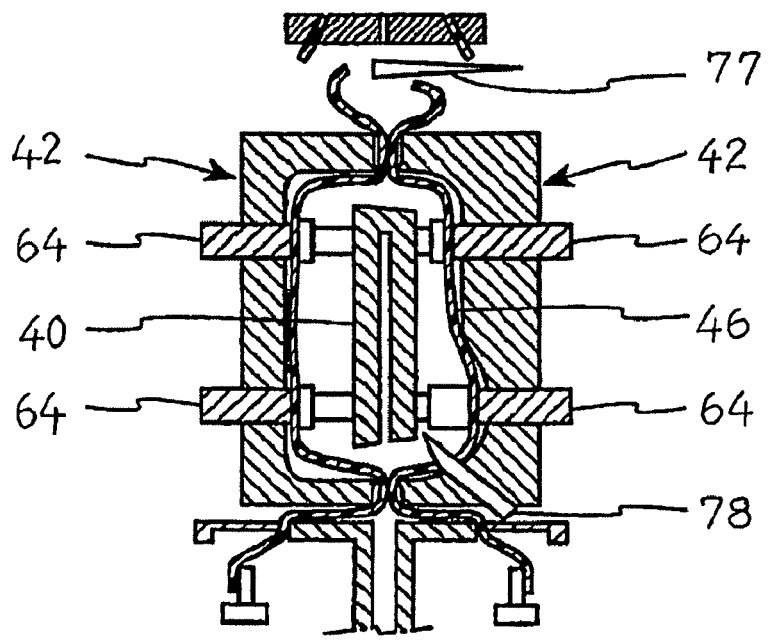
FIG. 11 is a sectional view of a first embodiment of the present invention in a process similar to that of FIG. 7, which shows a state in which a blow mold is closed, and an upper end of a parison is cut with a slide cutter.

Next, as shown in FIG. 11, the blow mold 42 is further closed, and the parison 46 is cut by a slide cutter 77. At this time, the blow mold 42 is not completely closed, but remains slightly open. When the blow mold 42 is closed, the slide cores 64 continuously push the parison 46 and the built-in part 40, whereby the built-in part 40 can be continuously held in a prescribed position.

Then, air is blown from the air nozzle 78 into the interior of the parison 46 to press the outer surface of the parison 46 against the blow mold 42, and consequently, the fuel tank 28 is roughly configured.

Figure 12:
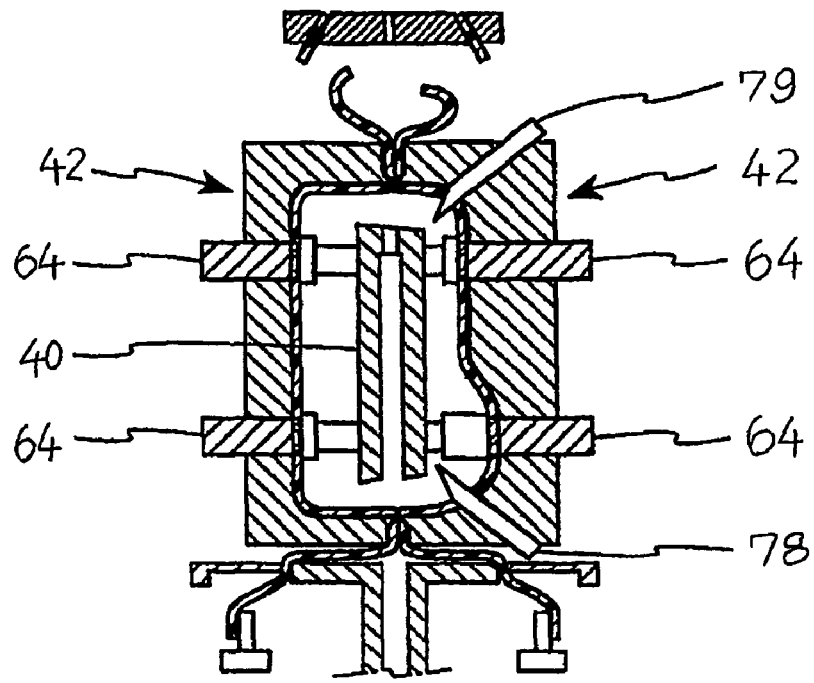
FIG. 12 is a sectional view of a first embodiment of the present invention in a process similar to that of FIG. 7, which shows a state in which a blow mold is closed, and a parison is inflated to contact a blow mold closely.

Next, as shown in FIG. 12, the blow mold 42 is closed completely. As a result, a forward end and a rear end of the parison 46 are closed completely with the blow mold 42.

The forward end and the rear end of the parison 46 can be closed by bringing the upper mating faces 68 and the lower mating faces 70 of the blow mold 42 into close contact with each other. Alternatively, by providing such pinching plates as referred in the prior art between the blow mold 42 and the parison holding unit 30, the upper part or the lower part of the parison 46 may be closed.

At this time, a tip face of each of the slide cores 64 can become flush with a molding surface defining the cavity 22 of the blow mold 42. Next, air is blown from the air nozzle 78 into the interior of the parison to press the outer surface of the parison 46 against the blow mold 42 completely. As a result, the fuel tank 28 can be configured completely. And by removing air from the parison 46 via an air vent port 79 while blowing air via the air nozzle 78, air is circulated in the interior of the parison 46, and blow molding is completed. Thereafter, the blow mold 42 is opened to eject the fuel tank 28 therefrom.

Next, a second embodiment of a blow molding device in accordance with the present invention along with a method for forming a fuel tank through blow molding using the blow molding device will be explained with reference to FIGS. 13 through 15.

The second embodiment differs from the first embodiment in the structure of the parison holding unit. The remainder of the structure of the blow molding device of the second embodiment is similar to that of the first embodiment. Only the different structure between the first embodiment and the second embodiment will be explained. And explanations of the similar structure will be omitted.

First, a parison holding unit 80 will be explained with reference to FIG. 13.

The parison holding unit 80 has an inner holding plate 82 adapted to be inserted within the end 44 of the parison 46, which projects from a lower end of a blow mold 84, and an outer holding plate 86 adapted to hold an outer surface of the lower end of the parison 46, similarly to that of the first embodiment, but differs from that of the first embodiment in that a parison expander 88 is provided around the inner holding plate 82 so as to slide outwardly thereof. The parison expander 88 is arranged such that when the parison expander 88 is slid inwardly, it becomes integral with the inner holding plate 82. The parison expander 88 may be formed into a plate-shaped configuration, as shown in FIG. 13, but may be formed into a several rods so as to surround the inner holding plate 82.

When the parison 46 is lowered from the nozzle 66, the lower end 44 of the parison 46 may be reduced in diameter, or may be wrinkled, but the parison expander 88 can enlarge an opening of the lower end 44 of the parison 46 to facilitate the insertion of the inner holding plate 82, thereby preventing projecting ends of the built-in part 40 from contacting an inner surface of the parison 46.

A center hole 90 is provided in an axial center of the inner holding plate 82 for sliding a built-in part holding rod 92 with good sealing properties.

The outer holding plate 86 has a recess 94 with a configuration conforming to that of an outer surface of the inner holding plate 82 along with an outer surface the parison expander 88. With this arrangement, when the parison expander 88 becomes integral with the inner holding plate 82, the inner holding plate 82 and the outer holding plate 86 can hold the lower end 44 of the parison 46.

In addition, the outer holding plate 86 is split to a plurality of holding plate members, and each of the holding plate members is arranged so as to slide and hold the lower end 44 of the parison 46. In the present embodiment, the outer holding plate 86 is split to two holding plate members, but it may be split to three or more holding plate members.

When the outer holding plate 86 is slid in directions shown by arrows in FIG. 13, it pushes the outer surface of the lower end 44 of the parison 46, and consequently, the inner holding plate 82, the parison expander 88 and the outer holding plate 86 can securely hold the parison 46 to prevent air from leaking therebetween, whereby the parison 46 can be inflated. In addition, the volume of the interior of the parison 46 can be kept great so that a sufficient amount of air can be sealed. Therefore, the preblowing step of slightly inflating the parison 46 for effecting tension adapted to pierce an air nozzle therethrough before blowing air to bring the parison 46 into close contact with a molding surface of the blow mold can be omitted.

In order to form the blow molded article with the blow molding device of the present embodiment, as shown in FIG. 14, the parison 46 is lowered from a nozzle 66 while leaving the blow mold 84 open. The parison 46 within which the built-in part 40 is positioned lowers downwardly of the lower part of the blow mold 84. Then, the inner holding plate 82 is inserted the interior of the lower end 44 of the parison 46.

After a tip end of the lower end 44 of the parison 46 is held with the parison expander 88, the parison expander 88 is slid outwardly to enlarge the opening of the lower end 44 of the parison 46 so that the built-in part 40 does not contact the parison 46. And since the inner holding plate 82 does not contact the parison 46, the inner holding plate 82 can be readily inserted into the interior of the parison 46.

Next, as shown in FIG. 15, the outer holding plate 86 is slid to contact the parison 46, and the parison expander 88 is slid inwardly to become integral with the inner holding plate 82, whereby the inner holding plate 82, the parison expander 88 and the outer holding plate 86 hold the lower end 44 of the parison 46. With this arrangement, air is prevented from leaking along the lower end 44 of the parison 46, and the lower end 44 of the parison 46 can be left inflated without being crushed so that the built-in part 40 does not contact the inner surface of the parison 46. Therefore, the inner surface of the parison 46 is prevented from being depressed or wrinkled.

Succeeding steps for blow molding of the second embodiment are similar to those of the first embodiment, and accordingly, explanations thereof will be omitted.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A blow molding device for forming a blow molded article, comprising:
   a blow mold adapted to form an outer wall of the blow molded article; and
   a parison holding unit adapted to hold a lower end of a parison,
   wherein said blow mold includes two mold members split along a parting line thereof, said two mold members defining a cavity adapted to form the blow molded article in split faces thereof, wherein said parison holding unit is provided on a lower side of said blow mold, and including an inner holding plate adapted to be inserted in an interior of said lower end of said parison, and an outer holding plate adapted to hold an outer surface of said lower end of said parison, said outer holding plate having a recess conforming to a configuration of said inner holding plate such that said inner holding plate and said outer holding plate hold said lower end of said parison, and said outer holding plate being split into a plurality of split plates such that each of said split plates is capable of sliding to hold said lower end of said parison, wherein the blow molded article has a built-in part in an interior thereof, wherein said blow molding device has a built-in part holding unit adapted to hold the built-in part in the blow molded article, said built-in part holding unit is provided in said split faces of said blow mold, wherein a slide core is provided in an interior of said cavity so as to freely advance and retreat such that the built-in part and said parison are held with said slide core, and the outer wall of the blow molded article is formed in said cavity, and wherein said built-in part holding unit includes a holding rod adapted to hold the built-in part, said holding rod being arranged to freely advance and retreat such that when said blow mold is opened, said built-in part is held in a position facing said cavity of said blow mold, whereas when said blow mold is closed, said built-in part is positioned in an interior of said parison, and after said parison and the built-in part are held with said slide core, said holding rod is removed from said blow mold.

2. A blow molding device as claimed in claim 1, wherein said inner holding plate has a configuration selected from one of a circular configuration, an elliptical configuration and a polygonal configuration.

3. A blow molding device as claimed in claim 1, wherein said outer holding plate is split into two split plate members so as to respectively move toward an end face of said inner holding plate by a cylinder to contact the same, thereby holding the lower end of said parison with said inner holding plate and said outer holding plate, and after the built-in part is held with said slide core, said blow mold is closed to carry out blow molding.

4. A blow molding device as claimed in claim 1, wherein a parison expander capable of sliding in a radial direction of said parison is provided around said inner holding plate for enlarging a lower end of said parison in a radial direction.

5. A blow molding device as claimed in claim 4, wherein when said outer holding plate holds an outer side of said lower end of said parison, said parison expander becomes integral with said inner holding plate to hold an inner side of said parison.

6. A blow molding device for forming a blow molded article, comprising:
a blow mold adapted to form an outer wall of the blow molded article; and
a parison holding unit adapted to hold a lower end of a parison,
wherein said blow mold includes two mold members split along a parting line thereof, said two mold members defining a cavity adapted to form the blow molded article in split faces thereof,
wherein said parison holding unit is provided on a lower side of said blow mold, and including an inner holding plate adapted to be inserted in an interior of said lower end of said parison, and an outer holding plate adapted to hold an outer surface of said lower end of said parison, said outer holding plate having a recess conforming to a configuration of said inner holding plate such that said inner holding plate and said outer holding plate hold said lower end of said parison, and said outer holding plate being split into a plurality of split plates such that each of said split plates is capable of sliding to hold said lower end of said parison, and
wherein said blow molding device comprises a built-in part holding unit adapted to hold a built-in part in the blow molded article, said built-in part holding unit being provided in said split faces of said blow mold.

7. A blow molding device as claimed in claim 6, further comprising a slide core provided in an interior of said cavity so as to freely advance and retreat such that the built-in part and said parison are held with said slide core, and the outer wall of the blow molded article is formed in said cavity.

8. A blow molding device as claimed in claim 1, wherein said recess has a configuration selected from one of a circular configuration, an elliptical configuration and a polygonal configuration.

9. A blow molding device as claimed in claim 1, wherein said inner holding plate has a polygonal configuration and said recess has a polygonal configuration, which matches the configuration of said inner holding plate.

10. A blow molding device as claimed in claim 1, further comprising cores slidably provided in the two mold members.

11. A blow molding device as claimed in claim 1, wherein said inner holding plate comprises a throughhole,
wherein the blow molding device further comprises:
a built-in part holding rod, configured to hold a built-in part in the blow molded article, said built-in part holding rod extending through the throughhole; and
a seal provided between said built-in part holding rod and the throughhole.

12. A blow molding device as claimed in claim 1, wherein said parison holding unit further comprises a holding section configured to hold a portion of said lower end of said parison, which extends from said inner holding plate and said outer holding plate.

13. A blow molding device as claimed in claim 4, wherein said parison expander comprises one of a plate-shape configuration and a plurality of rods surrounding said inner holding plate.

14. A blow molding device as claimed in claim 4, wherein the configuration of said recess further conforms to an outer surface of said parison expander.

15. A blow molding device, comprising:
a blow mold adapted to form an outer wall of a blow molded article; and
a parison holding unit adapted to hold a lower end of a parison, said parison holding unit being provided on a lower side of said blow mold, said parison holding unit comprising:
an inner holding plate adapted to be inserted in an interior of said lower end of said parison; and
an outer holding plate adapted to hold an outer surface of said lower end of said parison, said outer holding plate having a recess conforming to a configuration of said inner holding plate such that said inner holding plate and said outer holding plate hold said lower end of said parison.

16. The blow molding device according to claim 15, wherein said parison holding unit further comprises a parison expander, capable of sliding in a radial direction of said parison, provided around said inner holding plate for enlarging a lower end of said parison in a radial direction.

17. The blow molding device according to claim 16, wherein the configuration of said recess further conforms to an outer surface of said parison expander.

* * * * *